United States Patent
Hughes et al.

(10) Patent No.: US 9,740,623 B2
(45) Date of Patent: Aug. 22, 2017

(54) OBJECT LIVENESS TRACKING FOR USE IN PROCESSING DEVICE CACHE

(71) Applicant: Intel Corporation, Santa Clara, CA (US)

(72) Inventors: Christopher J. Hughes, Santa Clara, CA (US); Daehyun Kim, San Jose, CA (US); Jong Soo Park, Santa Clara, CA (US); Richard M Yoo, Stanford, CA (US); Ganesh Bikshandi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 304 days.

(21) Appl. No.: 13/993,034

(22) PCT Filed: Mar. 15, 2013

(86) PCT No.: PCT/US2013/032093
§ 371 (c)(1),
(2) Date: Jun. 10, 2013

(87) PCT Pub. No.: WO2014/142969
PCT Pub. Date: Sep. 18, 2014

(65) Prior Publication Data
US 2014/0304477 A1    Oct. 9, 2014

(51) Int. Cl.
*G06F 12/08*    (2016.01)
*G06F 12/12*    (2016.01)
*G06F 12/02*    (2006.01)
*G06F 12/0891*    (2016.01)
*G06F 12/127*    (2016.01)

(52) U.S. Cl.
CPC ........ *G06F 12/0891* (2013.01); *G06F 12/127* (2013.01); *G06F 12/023* (2013.01); *Y02B 60/1225* (2013.01)

(58) Field of Classification Search
CPC ............... G06F 12/127; G06F 12/1009; G06F 12/0891; G06F 12/023
See application file for complete search history.

(56) References Cited

U.S. PATENT DOCUMENTS 4,876,646 A * 10/1989 Gotou ................. G06F 12/1009
711/206
2003/0126369 A1   7/2003 Creta et al.
(Continued)

OTHER PUBLICATIONS

International Search Report and Written Opinion received for PCT Patent Application No. PCT/US2013/032093, mailed on Dec. 13, 2013, 13 pages.
(Continued)

*Primary Examiner* — Ann J Lo
*Assistant Examiner* — Masud Khan
(74) *Attorney, Agent, or Firm* — Lowenstein Sandler LLP

(57) ABSTRACT

A processing device comprises a processing device cache and a cache controller. The cache controller initiates a cache line eviction process and determines determine an object liveness value associated with a cache line in the processing device cache. The cache controller applies the object liveness value to a cache line eviction policy and evicts the cache line from the processing device cache based on the object liveness value and the cache line eviction policy.

19 Claims, 8 Drawing Sheets

(56) References Cited

U.S. PATENT DOCUMENTS

| | | | |
|---|---|---|---|
| 2004/0024970 A1* | 2/2004 | Chauvel | G06F 12/0253 |
| | | | 711/133 |
| 2006/0026360 A1* | 2/2006 | Morris | G06F 12/0891 |
| | | | 711/133 |
| 2006/0143396 A1 | 6/2006 | Cabot | |
| 2011/0066808 A1 | 3/2011 | Flynn et al. | |
| 2011/0087845 A1* | 4/2011 | Burger | G06F 12/0879 |
| | | | 711/136 |
| 2012/0036301 A1* | 2/2012 | Caspole | G06F 9/5066 |
| | | | 710/308 |
| 2012/0198175 A1 | 8/2012 | Atkisson | |
| 2013/0067286 A1 | 3/2013 | Sutardja et al. | |

OTHER PUBLICATIONS

Search Report and Written Opinion for PCT/US2013/032093 mailed Dec. 13, 2013.

\* cited by examiner

OBJECT LIVENESS TRACKING FOR USE IN PROCESSING DEVICE CACHE

TECHNICAL FIELD

This disclosure relates to the field of processing devices and, in particular, to object liveness tracking for use in a processing device cache.

BACKGROUND

Under a high-level programming language, memory regions accessed by an application are typically represented as a set of "objects," such as arrays, matrices, class instances, etc. At a given time in execution, an object is "live" when the application still reads and writes data to/from the memory region. An object may be considered "dead" when the memory region will no longer be accessed by the application. Such "liveness" information can convey when the modified value stored in an object will not be re-read by the application. For example, for a C or C++ program, a region of memory returned to the memory allocator through free( )/delete would not be accessed again, unless re-allocated through malloc( )/new. In addition, the liveness status for stack data can be determined by observing the stack pointer. Objects that are above the stack pointer, can be considered to be "dead" as they are no longer accessed.

BRIEF DESCRIPTION OF THE DRAWINGS

The present disclosure is illustrated by way of example, and not by way of limitation, in the figures of the accompanying drawings.

DETAILED DESCRIPTION

Figure 1:
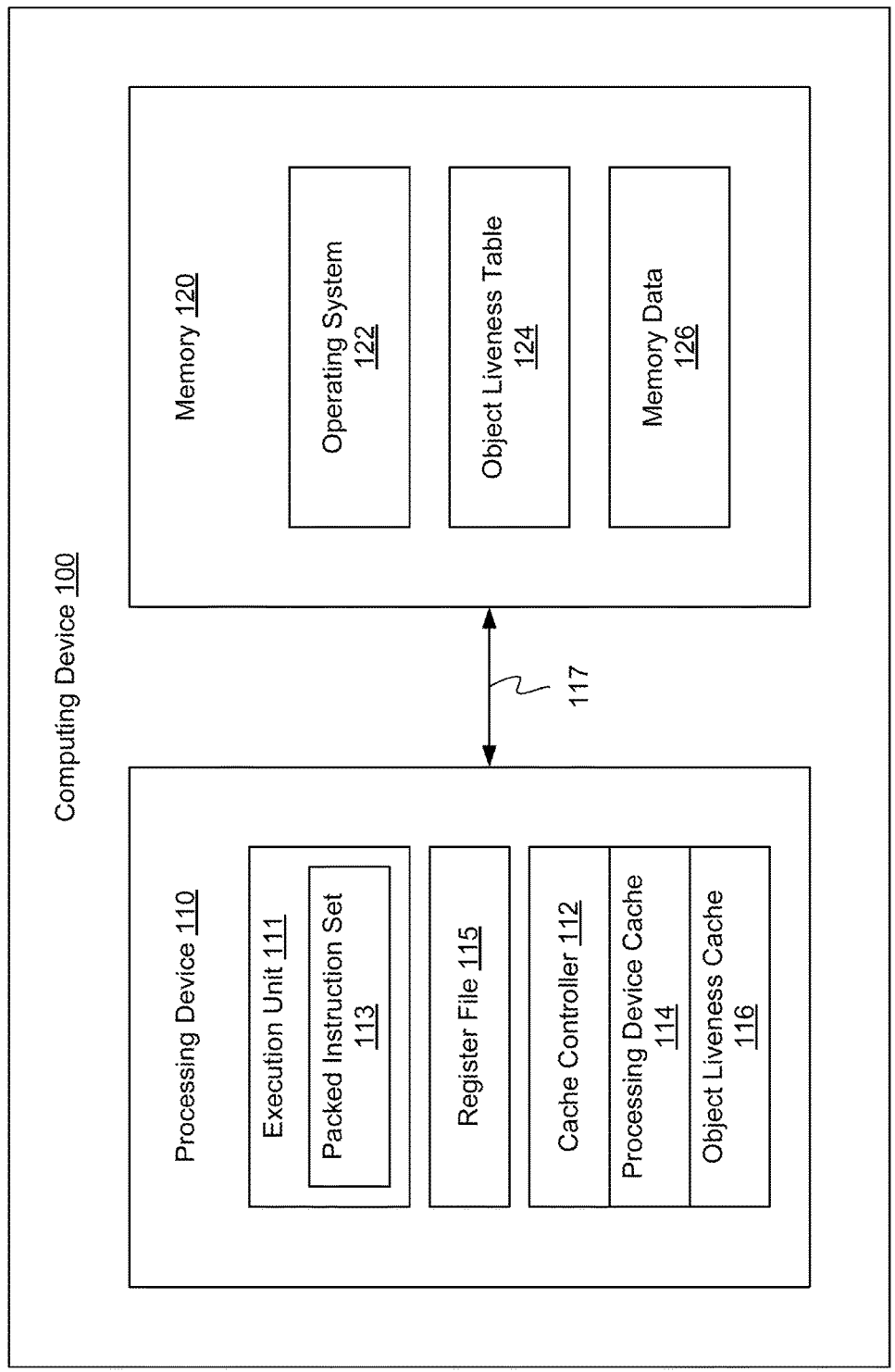
FIG. 1 is a block diagram illustrating a computing device that uses object liveness tracking in a processing device cache, according to an embodiment.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Described herein is a system and method for object liveness tracking for use in a processing device cache. In one embodiment, object liveness data may be used by a processing device cache in order to optimize or improve the cache eviction process. At a given time in execution, a storage object (e.g., memory region, array, matrix, class instance, etc) is live when the application still reads and writes data to/from the memory region. An object may be considered dead when the memory region will no longer be accessed by the application. In one embodiment, an operating system executed by the processing device exposes an object liveness programming interface in order to receive object liveness information about the objects represented in the processing device cache. Through a call of the programming interface, an entity such as a programmer, a compiler, or a runtime system can provide the object liveness information. The object liveness information can be determined in a number of ways, as will be described below.

Once the object liveness information is obtained, the operating system can store the information in an object liveness table in memory. In one embodiment, the object liveness table is a lookup table including a number of key/value pairs. In each pair, the key may be a physical address of the object and the value is an object liveness entry. The object liveness entry may include an indication of whether the corresponding object is "live" or "dead." When performing a cache eviction process, the processing device cache can look up the object liveness value from the object liveness table and use the value in conjunction with a cache eviction policy to determine which cache line from the processing device cache to evict. For example, in one embodiment, a cache replacement policy may statically assign higher priorities for live cache lines, and lower priorities for dead lines, while applying a known policy, such as least recently used, within each category. In addition, upon cache line eviction, if the cache line being evicted is dirty (i.e., if it has been written over since it was read from the memory), cache controller may write-back a copy of the evicted data to the corresponding location in memory if the object was live. If the evicted object is dead, the cache controller may refrain from performing the normal write-back, since the data is no longer needed.

In one embodiment, the processing device may include an object liveness cache which caches object liveness data from object liveness table. The object liveness cache may be located within the processing device and thus can be accessed quicker and using less bandwidth that querying object liveness table.

By using the object liveness information during a cache line eviction procedure, a processing device cache can function more efficiently. The object liveness information can help the processing device cache to decrease the chances of evicting a cache line that will be needed later, thereby preventing the processing device from having to retrieve that data from memory. This may save memory bandwidth, thereby resulting in improved performance and energy reduction.

FIG. 1 is a block diagram illustrating a computing device that uses object liveness tracking in a processing device cache, according to an embodiment. In one embodiment, the computing device 100 includes processing device 110 and memory 120. Computing device 100 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines that individually or jointly execute a set (or multiple sets) of instructions to perform any one or more of the methodologies discussed herein.

Processing device 110 may be, for example, a multi-core processor including multiple cores. These cores may be physical processors, and may include various components such as front end units, execution units and back end units. One embodiment of multi-core processor 110 is illustrated further below with respect to FIG. 6. Processing device 110 may represent one or more general-purpose processing devices such as a microprocessor, central processing unit, or the like. Processing device 110 may implement a complex instruction set computing (CISC) architecture, a reduced instruction set computer (RISC) architecture, a very long instruction word (VLIW) architecture, or other instruction sets, or a combination of instruction sets, through translation of binary codes in the above mentioned instruction sets by a compiler. Processing device 110 may also be one or more special-purpose processing devices such as an application specific integrated circuit (ASIC), a field programmable gate array (FPGA), a digital signal processor (DSP), network processor, or the like. Processing device 110 may be configured to execute processing logic for performing the operations discussed herein.

Processing device 110 may employ execution units including logic to perform algorithms for process data, such as in the embodiments described herein. Processing device 110 is representative of processing systems based on the PENTIUM MINI™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

In this illustrated embodiment, processing device 110 includes one or more execution units 111 to implement an algorithm that is to perform at least one instruction. One embodiment may be described in the context of a single processor desktop or server system, but alternative embodiments may be included in a multiprocessor system. The processing device 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processing device 110 may be coupled to a processor bus 117 that transmits data signals between the processing device 110 and other components in the device 100.

Execution unit 111, including logic to perform integer and floating point operations, also resides in the processing device 110. The processing device 110, in one embodiment, includes a microcode (ucode) ROM to store microcode, which when executed, is to perform algorithms for certain macroinstructions or handle complex scenarios. Here, microcode is potentially updateable to handle logic bugs/fixes for processing device 110. For one embodiment, execution unit 111 includes logic to handle a packed instruction set 113. By including the packed instruction set 113 in the instruction set of a general-purpose processing device 110, along with associated circuitry to execute the instructions, the operations used by many multimedia applications may be performed using packed data in a general-purpose processing device 110. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

In one embodiment, processing device 110 includes cache controller 112, processing device cache 114 and object liveness cache 116. Processing device cache 114 may be a specialized memory unit used by processing device 110 to reduce the average memory access times. Processing device cache 114 may be a smaller, faster memory which stores copies of data from the most frequently used locations in main memory 120. Data may be transferred between memory 120 and processing device cache 114 in blocks of fixed size, called cache lines. When a cache line is copied from memory 120 into processing device cache 114, a cache entry is created. The cache entry may include the copied data as well as the requested memory location. When processing device 110 needs to read from or write to a location in main memory 120, processing device 110 may first check whether a copy of the relevant data is currently in processing device cache 114. If the data is found in processing device cache 114, processing device 110 may read from or write to the cache. These cache accesses may typically be much faster than reading from or writing to memory 120. In one embodiment, as long as most memory accesses are cached memory locations, the average latency of memory accesses will be closer to the cache latency than to the latency of main memory. In one embodiment, the processing device cache 114 includes a Level 1 (L1) internal cache memory. Depending on the architecture, the processing device 110 may have a single internal cache or multiple levels of internal caches. Other embodiments include a combination of both internal and external caches depending on the particular implementation and needs. Register file 115 is to store different types of data in various registers including integer registers, floating point registers, vector registers, banked registers, shadow registers, checkpoint registers, status registers, and instruction pointer register.

Processing device cache 114, however, may be limited in size and/or capacity. Thus, in order to make room for a new entry on a cache miss, one of the existing entries in processing device cache 114 may have to be evicted. In one embodiment, cache controller 112 may determine which cache line to evict based on a replacement policy. The fundamental problem with any replacement policy is that it must predict which existing cache entry is least likely to be used in the future. One popular replacement policy is known as least-recently used (LRU) and replaces the least recently accessed entry. Other replacement policies may include most recently used, least frequently used, random replacement, or some other policy. In one embodiment, the cache controller 112 factors in object liveness data when determining which cache line to evict from the processing device cache.

Memory 120 may include a main memory, such as read-only memory (ROM), flash memory, dynamic random access memory (DRAM) (such as synchronous DRAM (SDRAM) or Rambus DRAM (RDRAM), etc.), or a static memory, such as flash memory, static random access memory (SRAM), etc. In other embodiments, memory 120 may include some other type of storage device for storing information in a form (e.g., software, processing application) readable by a machine (e.g., a computer). The storage device may include a machine-readable medium including, but not limited to, magnetic storage medium (e.g., floppy diskette), optical storage medium (e.g., CD-ROM), magneto-optical storage medium, erasable programmable memory (e.g., EPROM and EEPROM), flash memory; or another type of medium suitable for storing electronic instructions.

In one embodiment, memory 120 includes operating system 122, object liveness table 124 and memory data 126. Operating system 122 may include software, consisting of programs and data, that runs on computing device 100. Operating system 122 manages computer hardware and provides common services for efficient execution of various computer application software programs, on computing device 100. In one embodiment, operating system 122 maintains object liveness table 124. In one embodiment, object liveness table 124 is a lookup table including a number of key/value pairs. In each pair, the key may be a physical address of an object in processing device cache 114 and the value is an object liveness entry. The object liveness entry may include an indication of whether the corresponding object is "live" or "dead." The objects associated with entries in processing device cache 114 may be memory regions accessed by an application, such as arrays, matrices, class instances, etc. At a given time in execution, an object is "live" when the application still reads and writes data to/from the memory region. An object may be considered "dead" when the memory region will no longer be accessed by the application. Object liveness table 124 is described in more detail below.

In one embodiment, when the object liveness data is obtained from object liveness table 124, cache controller 112 may store a copy of the object liveness value in object liveness cache 116. In one embodiment, object liveness cache 116 may be implemented as a content-addressable memory (CAM). Object liveness cache 116 is designed to save the time and bandwidth associated with the object liveness table 124. Thus, as processing device cache 114 functions as a cache for the data stored in memory 120, object liveness cache 116 functions as a cache for the data stored in object liveness table 124. Upon initiating a cache eviction process, cache controller 112 may check object liveness cache 116 to determine if the relevant object liveness data is present there. If not, it may issue a request for the data from object liveness table 124. Upon receiving a response, cache controller 112 may evict a current entry in object liveness cache 116 (e.g., using any conventional cache eviction policy) and create a new entry for the newly received object liveness data.

In one embodiment, cache controller 112 manages the cache line eviction process for processing device cache 114. Cache controller 112 may use the object liveness data in object liveness cache 116 and/or object liveness table 124, either alone or in conjunction with some other cache eviction policy, in order to determine which cache line to evict from processing device cache 114. When the cache replacement policy needs to update the priorities of cache lines for purposes of determining which to evict, cache controller 112 may consult object liveness cache 116 and/or object liveness table 124. For example, in one embodiment, a cache replacement policy may statically assign higher priorities for live cache lines, and lower priorities for dead lines, while applying a known policy, such as least recently used, within each category. In addition, upon cache line eviction, if the cache line being evicted is dirty (i.e., if it has been written over since it was read from memory 120), cache controller 112 may determine whether the object is alive. If the object is alive, cache controller 112 may overwrite a copy of the evicted data in memory 120 at the corresponding location in memory data 126. This process may be referred to as a write-back. If the evicted object is dead, the cache controller may refrain from performing the normal write-back, since the data is no longer needed.

Figure 2:
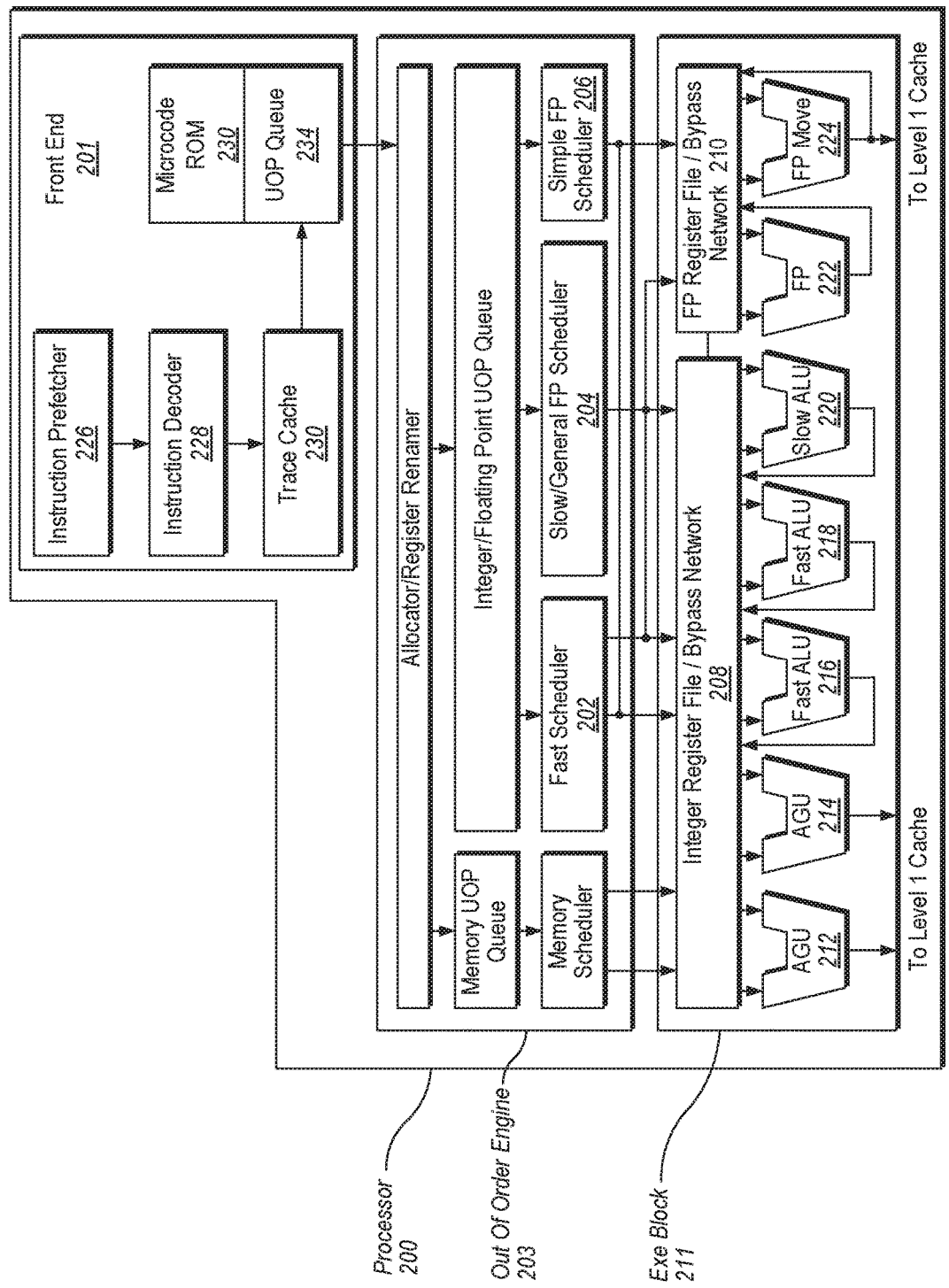
FIG. 2 is a block diagram of a processor according to one embodiment.

FIG. 2 is a block diagram of the micro-architecture for a processor 200 that includes logic circuits to perform instructions in accordance with one embodiment. The processor 200 may be one example of the processing device 110, described above with respect to FIG. 1. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For some embodiments, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3:
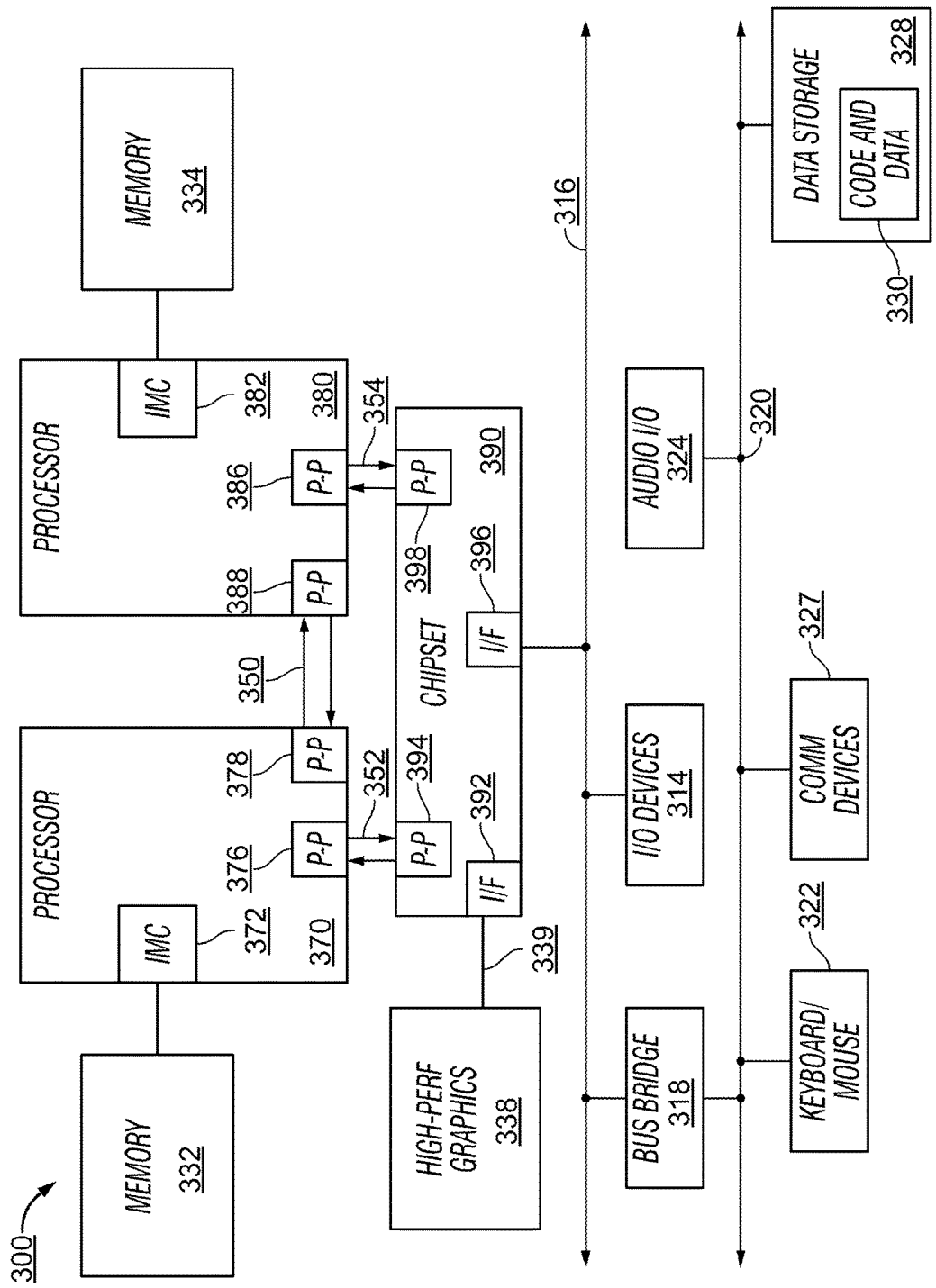
FIG. 3 is a block diagram of a computer system according to one embodiment.

Referring now to FIG. 3, shown is a block diagram of a system 300 in accordance with an embodiment. As shown in FIG. 3, multiprocessor system 300 is a point-to-point interconnect system, and includes a first processor 370 and a second processor 380 coupled via a point-to-point interconnect 350. Each of processors 370 and 380 may be some version of the processing device 110, as shown in FIG. 1.

While shown with only two processors 370, 380, it is to be understood that the scope of the present disclosure is not so limited. In other embodiments, one or more additional processors may be present in a given processor.

Processors 370 and 380 are shown including integrated memory controller units 372 and 382, respectively. Processor 370 also includes as part of its bus controller units point-to-point (P-P) interfaces 376 and 378; similarly, second processor 380 includes P-P interfaces 386 and 388. Processors 370, 380 may exchange information via a pointto-point (P-P) interface 350 using P-P interface circuits 378, 388. As shown in FIG. 3, IMCs 372 and 382 couple the processors to respective memories, namely a memory 332 and a memory 334, which may be portions of main memory locally attached to the respective processors.

Processors 370 and 380 may each exchange information with a chipset 390 via individual P-P interfaces 352, 354 using point to point interface circuits 376, 394, 386, 398. Chipset 390 may also exchange information with a high-performance graphics circuit 338 via a high-performance graphics interface 339.

A shared cache (not shown) may be included in either processor or outside of both processors, yet connected with the processors via P-P interconnect, such that either or both processors' local cache information may be stored in the shared cache if a processor is placed into a low power mode.

Chipset 390 may be coupled to a first bus 316 via an interface 396. In one embodiment, first bus 316 may be a Peripheral Component Interconnect (PCI) bus, or a bus such as a PCI Express bus or another third generation I/O interconnect bus, although the scope of the present disclosure is not so limited.

As shown in FIG. 3, various I/O devices 314 may be coupled to first bus 316, along with a bus bridge 318 which couples first bus 316 to a second bus 320. In one embodiment, second bus 320 may be a low pin count (LPC) bus. Various devices may be coupled to second bus 320 including, for example, a keyboard and/or mouse 322, communication devices 327 and a storage unit 328 such as a disk drive or other mass storage device which may include instructions/code and data 330, in one embodiment. Further, an audio I/O 324 may be coupled to second bus 320. Note that other architectures are possible. For example, instead of the point-to-point architecture of FIG. 3, a system may implement a multi-drop bus or other such architecture.

Figure 4:
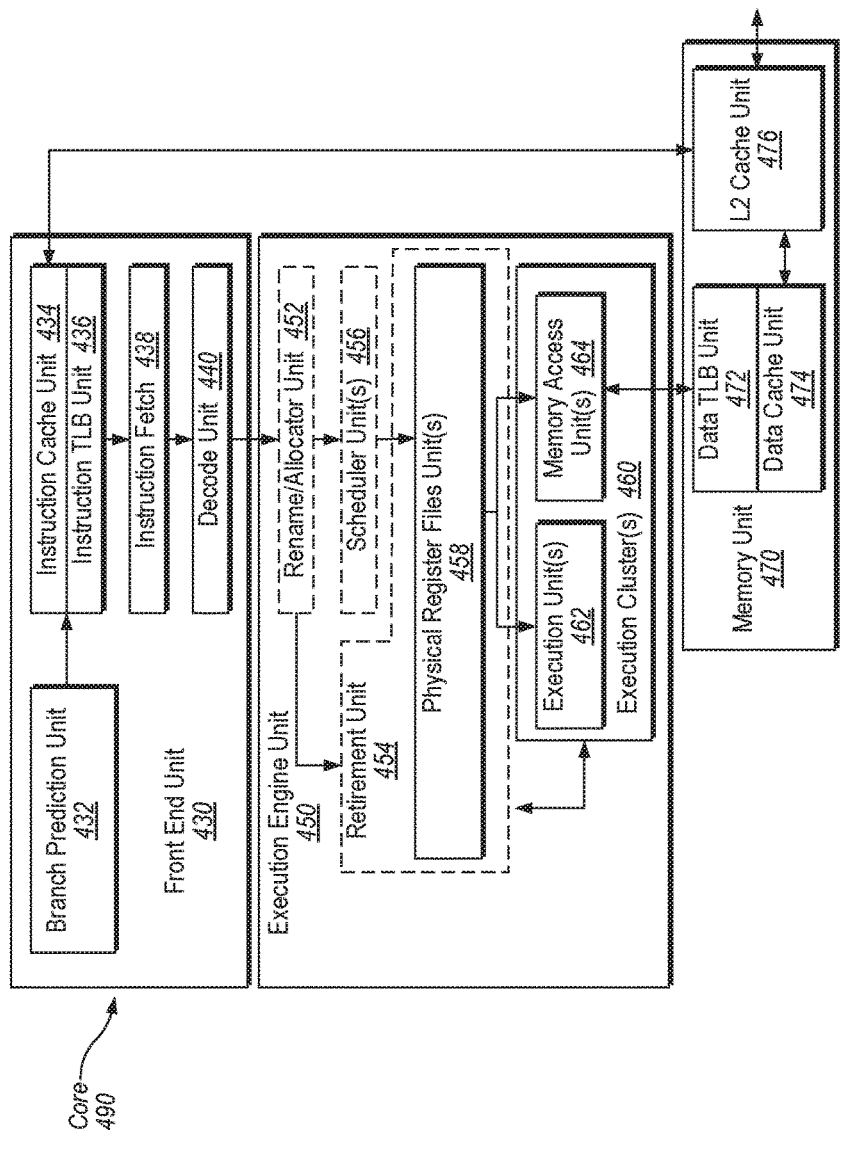
FIG. 4A illustrates elements of a processor micro-architecture according to one embodiment.
FIG. 4B illustrates elements of a processor micro-architecture according to one embodiment.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470. In one embodiment, the processor core 490 may be one example of processing device 110 and memory unit 470 may be one example of memory 120, as described above with respect to FIG. 1

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. In one embodiment, the translation lookaside buffer may be used to implement the object liveness cache 116, as shown in FIG. 1. The object liveness cache 116 may use a cache eviction policy that uses object liveness information, as described above. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450. In one embodiment, instruction cache unit 434 may be used to implement the processing device cache 114, as shown in FIG. 1.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
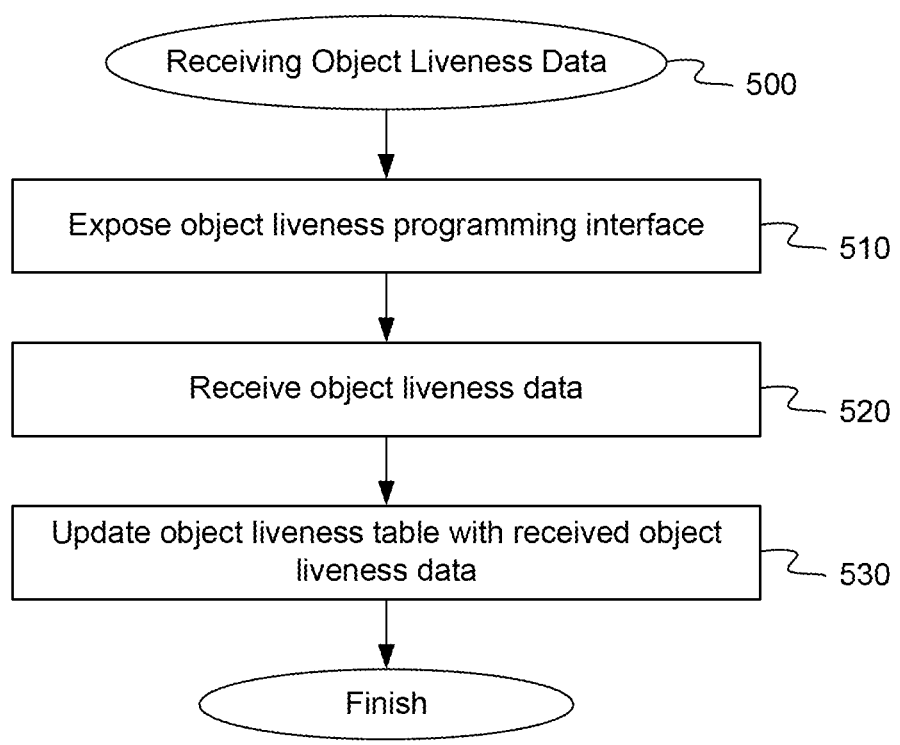
FIG. 5 is a flow diagram illustrating a method for receiving object liveness data, according to an embodiment.

FIG. 5 is a flow diagram illustrating a method for object liveness data, according to an embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. The processing logic may receive and store object liveness data that may be used by a processing device cache to manage cache evictions. In one embodiment, the method 500 is performed by operating system 122, as shown in FIG. 1.

Referring to FIG. 5, at block 510, method 500 exposes an object liveness programming interface. In one embodiment, operating system 122 exposes the object liveness programming interface, which may be for example, an application programming interface (API). The programming interface may include a set of standard functions designed to obtain object liveness data for a particular object in response to a call of the programming interface by some other party (e.g., a user, another application).

At block 520, method 500 receives object liveness data. In one embodiment, another entity makes a call of the programming interface exposed by the operating system 122. That entity may be, for example, a user of computing device 100 (e.g., a programmer) who manually calls the programming interface and supplies the object liveness data, a compiler running on computing device 100 that determines which objects are live and dead at certain points in time during compiling of computer application program code, a runtime system (e.g., a Java Virtual Machine running on computing device 100) or some other entity. For example, a programmer writing a C or C++ program could designate a region of memory returned to the memory allocator through free( )/delete as a dead object, because that region will not be accessed again, unless re-allocated through malloc( )/new. In addition, the compiler can determine the liveness status for stack data by observing the stack pointer. Objects that are above the stack pointer, can be considered to be "dead" as they are no longer accessed. Similar behavior could be observed for software based scratchpad memories. For example, if a memory region is no longer used as a scratchpad, the value in that region can be simply discarded because the region is dead. The programming interface call made by one of these entities may include an indication of whether the corresponding object is live or dead. This indication may be referred to as object liveness data.

At block 530, method 500 updates object liveness table 124 with the received object liveness data. In response to receiving the object liveness data, operating system 122 may create an entry (or update a pre-existing entry) in object liveness table 124. In one embodiment, object liveness table 124 is a lookup table including a number of key/value pairs. In each pair, the key may be a physical address of an object in processing device cache 114 and the value is an object liveness entry. The object liveness entry may include the indication of whether the corresponding object is live or dead. In one embodiment, the indication may be a single bit having a binary value (e.g., where logic 0 indicates a live region and logic 1 indicates a dead region, or vice versa). In other embodiments, the object liveness entry may include additional information, such as a virtual address of the memory region, or other information which may be used for debugging purposes.

Figure 6:
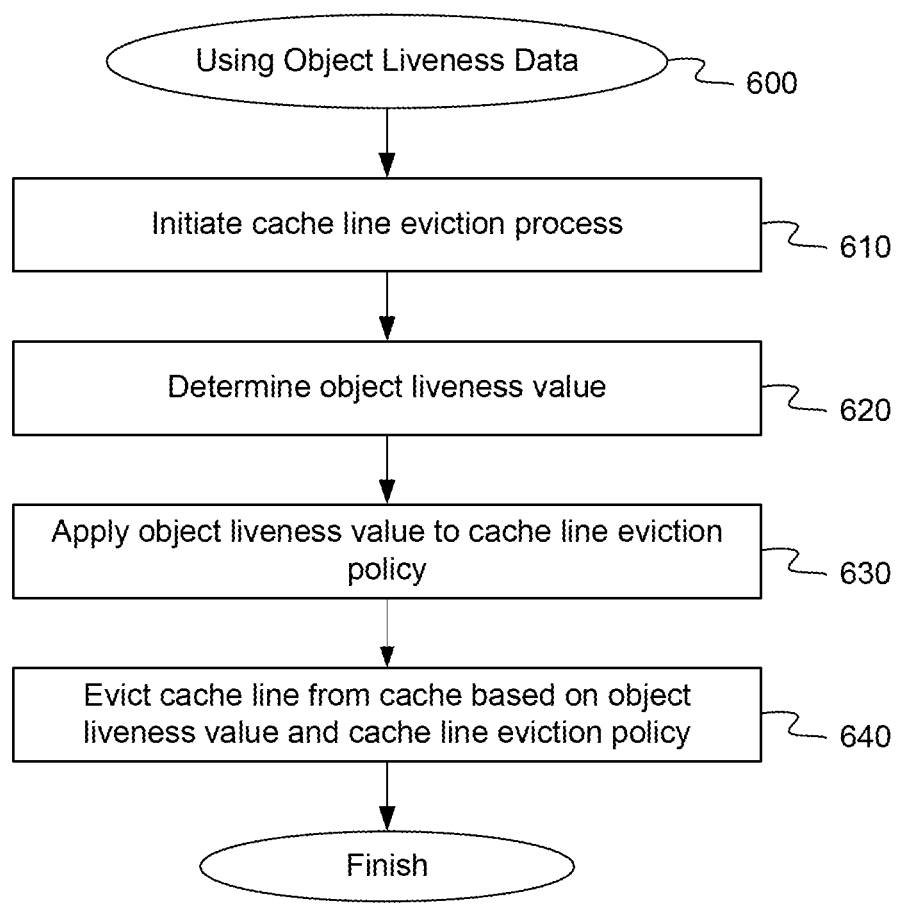
FIG. 6 is a flow diagram illustrating a method for using object liveness data in a cache eviction policy, according to an embodiment.

FIG. 6 is a flow diagram illustrating a method for using object liveness data in a cache eviction policy, according to an embodiment. The method 600 may be performed by processing logic that may comprise hardware (e.g., circuitry, dedicated logic, programmable logic, microcode, etc.), software (e.g., instructions run on a processing device to perform hardware simulation), or a combination thereof. The processing logic may determine an object liveness value associated with objects in the processing device cache and use those object liveness values to manage cache evictions. In one embodiment, the method 600 is performed by cache controller 112, as shown in FIG. 1.

Referring to FIG. 6, at block 610, method 600 initiates a cache line eviction process. Processing device cache 114 may be limited in size and/or capacity. Thus, in order to make room for a new entry in processing device cache 114, one of the existing entries may have to be evicted. In one embodiment, when cache controller 112 checks processing device cache 114 for a particular piece of data, and that data is not found, it may be referred to as a cache miss. In that instance, processing device 110 may query memory 120 for the requested data. Upon retrieving the data from memory 120, cache controller 112 may add the data to processing device cache 114. If processing device cache 114 is currently full, cache controller 112 may initiate a cache line eviction process.

At block 620, method 600 determines an object liveness value associated with a cache line in processing device cache 114. In one embodiment, cache controller 112 determines an object liveness value associated with a cache line from object liveness cache 116 or by querying object liveness table 124 in memory 120. Each cache line in processing device cache may have an associated physical address by which the cache line may be identified. The physical address may be of the actual cache line itself in processing device cache 114 or of a corresponding storage object in memory 120. In one embodiment, cache controller 112 may first look for an entry in object liveness cache 116 corresponding to the physical address of the cache line. If an entry is found, cache controller 112 may read the object liveness value from the entry. If there is no corresponding entry in object liveness cache 116, cache controller may send a request to operating system 122 to check object liveness table 124. Operating system 122 may look for an entry in object liveness table 124 corresponding to the physical address and read the object liveness value found there. In another embodiment, cache controller 112 may skip checking object liveness cache 116 (e.g., if processing device 110 does not include an object liveness cache) and proceed to querying object liveness table 124. In one embodiment, cache controller 112 may determine the object liveness value for each cache line in processing device cache 114.

At block 630, method 600 applies the object liveness value to a cache line eviction policy. Cache controller 112 may use the object liveness value obtained from either object liveness cache 116 or object liveness table 124, either alone or in conjunction with some other cache eviction policy, in order to determine which cache line to evict from processing device cache 114. For example, in one embodiment, a cache replacement policy may statically assign higher priorities for live cache lines, and lower priorities for dead lines, while applying a known policy, such as least recently used, within each category. Thus, cache controller 112 may place each cache line from processing device cache 114 into either a live category or a dead category, depending on the determine object liveness value. Then, cache controller 112 may evict cache lines from the dead category using a known policy (e.g., LRU). In one embodiment, cache controller 112 may only evict cache lines from the dead category, until no cache lines in the dead category remain. Once that occurs, cache controller 112 may begin evicting cache lines from the live category as needed, according to the same or a different eviction policy. In another embodiment, upon cache line eviction, if the cache line being evicted is dirty (i.e., if it has been written over since it was read from memory 120), cache controller 112 may write-back a copy of the evicted data in memory 120 at the corresponding location in memory data 126 if the object was live. If the evicted object is dead, the cache controller may refrain from performing the normal write-back, since the data is no longer needed.

At block 640, method 600 evicts a cache line from the processing device cache based on the object liveness value and the cache line eviction policy.

Figure 7:
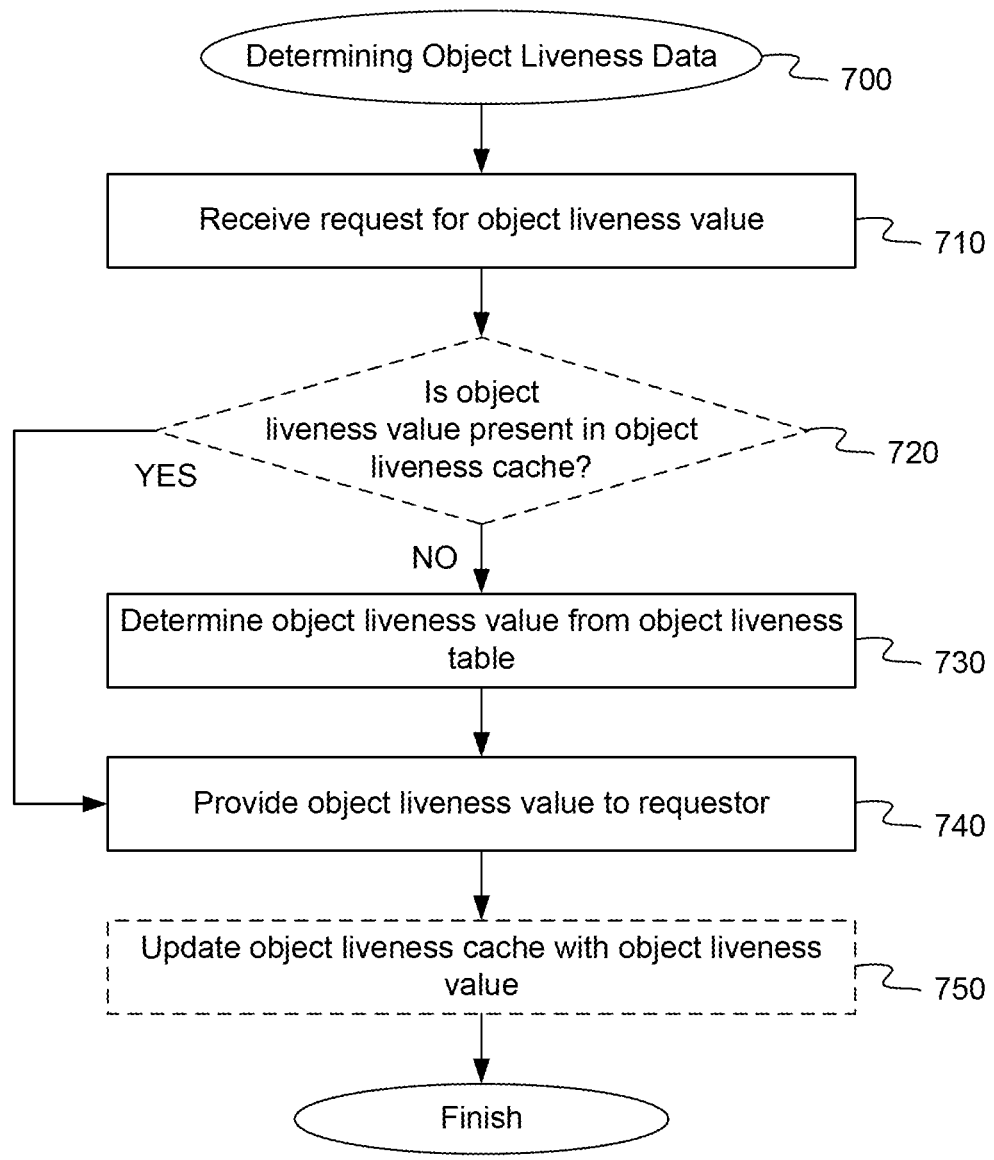
FIG. 7 is a flow diagram illustrating a method for determining object liveness data, according to an embodiment.

FIG. 7 is a flow diagram illustrating a method for determining object liveness data, according to an embodiment. The method 700 may be performed by processing logic that may comprise hardware (e.g., circuitry, dedicated logic, programmable logic, microcode, etc.), software (e.g., instructions run on a processing device to perform hardware simulation), or a combination thereof. The processing logic may determine an object liveness value using an object liveness table and provide the object liveness value to a requestor. In one embodiment, the method 700 is performed by operating system 122, as shown in FIG. 1 and by memory controller hardware in computing device 100.

Referring to FIG. 7, at block 710, method 700 receives a request for an object liveness value. In one embodiment, when cache controller 112 initiates the cache line eviction process as described above, cache controller 112 generates a request for the object liveness value corresponding to a particular cache line in processing device cache 114. This request may be sent to either object liveness cache 116 or object liveness table 124.

At block 720, method 700 optionally determines whether the object liveness value is present in object liveness cache 116. In one embodiment, cache controller 112 may first look for an entry in object liveness cache 116 corresponding to the physical address of the cache line. If an entry is found, cache controller 112 may read the object liveness value from the entry. Object liveness cache 116 is designed to save the time and bandwidth associated with accessing the object liveness table 124. Thus, if processing device 110 includes object liveness cache 116, cache controller may first check object liveness cache 116 for the object liveness value, as doing so will likely be faster and use less bandwidth than querying object liveness table 124 in memory 120.

If at block 720, method 700 determines that the object liveness value is not present in object liveness cache 116 (or if processing device 110 does not include an object liveness cache), at block 730, method 700 determines the object liveness value from object liveness table 124. Operating system 122 may receive a query from processing device 110 including a physical address identifying a particular storage object. Operating system 122 may perform a lookup operation on object liveness table 124 in order to determine the object liveness value associated with the physical address in the request. One embodiment of object liveness table 124 is described below with respect to FIG. 8.

If at block 720, method 700 determines that the object liveness value is present in object liveness cache 116, or once the object liveness value is determined from object liveness table 124 at block 730, at block 740, method 700 provides the object liveness value to the requestor. In one embodiment, the requestor may be cache controller 112, which made the request as part of a cache eviction process.

In other embodiments, however, the requestor may be some other entity, and the object liveness value is provided to that entity accordingly.

At block 750, method 700 optionally updates object liveness cache 116 with the object liveness value. If the object liveness value was not initially found in object liveness cache 116, upon receiving the object liveness value from object liveness table 124, cache controller 112 may evict a current entry in object liveness cache 116 (e.g., using any conventional cache eviction policy) if necessary, and create a new entry for the newly received object liveness value. Thus, if the object liveness value is needed again in the future, cache controller 112 may retrieve the value from object liveness cache 116 rather than querying objet liveness table 124.

Figure 8:
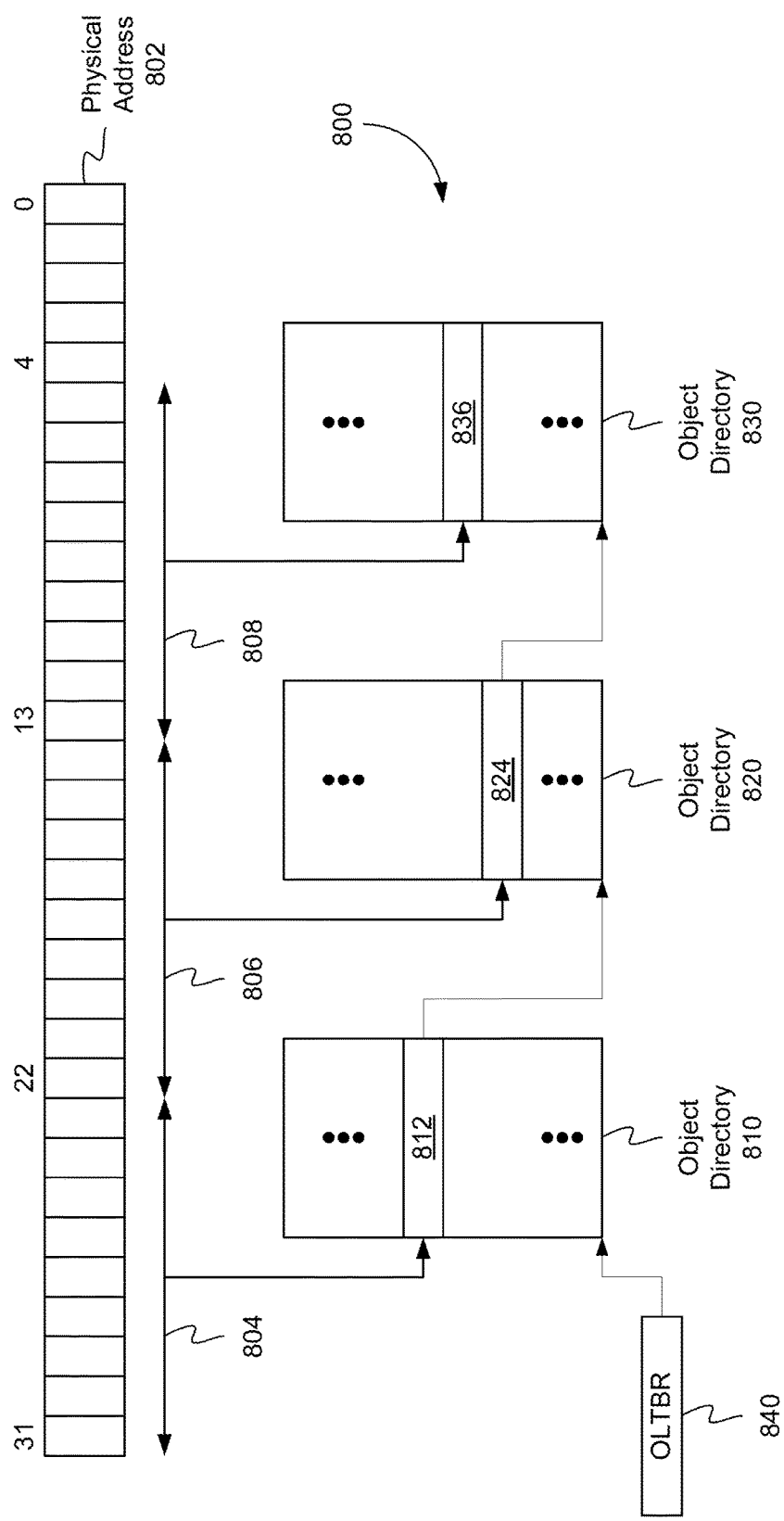
FIG. 8 is a block diagram illustrating an object liveness table, according to an embodiment.

FIG. 8 is a block diagram illustrating an object liveness table, according to an embodiment. In one embodiment, the object liveness table 800 may be representative of object liveness table 124, as described above. Object liveness table 800 may be a hierarchical data structure including multiple object directories 810, 820, 830. In another embodiment, object liveness table 800 may include a single data structure, or some other number of data structures.

As described above, the entries in object liveness table 800 may be indexed based on a physical address 802 of a storage object in memory 120. In one embodiment, physical address 802 is a 32 bit value. In other embodiments, however, physical address 802 may have some other length (e.g., 64 bits). Physical address 802 may be divided into a number of segments, such as a first segment 804 represented by bits 23-31 of physical address 802, second segment 806 represented by bits 14-22, and third segment 808 represented by bits 5-13. In the illustrated embodiment, there are three segments that are each 9 bits in length. In other embodiments, however, there may be some other number of segments and/or the segments may have some other length. In general, the number of segments 804, 806, 808 may correspond to the number of object directories 810, 820, 830 in object liveness table 800 and the length of the segments may correspond to the size of each object directory.

In one embodiment, object liveness table 800 includes an object liveness table base register (OLTBR) 840 that stores a base address in memory of the first level object directory 810. The first segment 804 of physical address 802 points to a first entry 812 in object directory 810. Since there are 9 bits in the first segment 804, object directory 810 may contain up to 812 entries. The value stored in the first entry 812 may point to the base address of the second level object directory 820. The second segment 806 of physical address 802 points to an entry 824 in object directory 820. The value stored in the entry 824 may point to the base address of the third level object directory 830. The third segment 808 of physical address 802 points to an entry 836 in object directory 830. In one embodiment, since the third segment 808 is the last segment and object directory 830 is the last object directory, the value in entry 836 may include an object liveness value for the object represented by physical address 802. In one embodiment, the object liveness value may be a single bit having a binary value (e.g., where logic 0 indicates a live region and logic 1 indicates a dead region, or vice versa). In other embodiments, the object liveness entry 836 may include additional information, such as a virtual address of the memory region, or other information which may be used for debugging purposes.

In other embodiments, where there are additional segments of physical address 802 and additional object directories, the entry 836 in object directory 830 may include the base address of a subsequent object directory, and the process may continue as described. Having a hierarchical structure with multiple object directories 810, 820, 830, reduces the space requirements for implementing object liveness table 800. Because each object directory can be located at a non-sequential base address, a large chunk of contiguous memory space is not needed. If however, sufficient contiguous memory space is available, object liveness table 800 may be implemented as a single structure in memory 120.

The following examples pertain to further embodiments.

Example 1 is a processing device comprising 1) a processing device cache; and 2) a cache controller coupled to the processing device cache, the cache controller to initiate a cache line eviction process, determine an object liveness value associated with a cache line in the processing device cache, and evict the cache line from the processing device cache based on the object liveness value and a cache line eviction policy associated with the cache line eviction process.

In Example 2, the processing device of Example 1 can optionally include an object liveness cache, wherein to determine the object liveness value, the cache controller to check the object liveness cache for an entry corresponding to the cache line.

In Example 3, the cache controller in the processing device of Example 2 can optionally determine the object liveness value from an object liveness table stored in a memory communicably coupled to the processing device if the object liveness cache does not have an entry corresponding to the cache line.

In Example 4, the object liveness table in the processing device of Example 3 can optionally include a lookup table having a plurality of key/value pairs, wherein the key comprises a physical address of an object in the processing device cache and wherein the value comprises an indication of whether the object at the physical address is dead.

In Example 5, for the processing device of Example 4, an object is dead if the object will no longer be accessed during the execution of an application running on the processing device.

In Example 6, for the processing device of Example 1, the cache line eviction policy optionally decreases a priority of the cache line when the object liveness value indicates that the cache line is dead.

In Example 7, for the processing device of Example 1, the cache line eviction policy optionally indicates not to write back an evicted cache line to a memory communicably coupled to the processing device.

Example 8 is a system comprising 1) a processing device having a processing device cache; and 2) a memory, communicably coupled to the processing device, the memory to store an operating system and an object liveness table, wherein the operating system to receive a request from the processing device cache for an object liveness value stored in the object liveness table, determine the object liveness value from the object liveness table in response to the request, and provide the object liveness value to the processing device cache.

In Example 9, the processing device in Example 8 optionally further comprises an object liveness cache and a cache controller, wherein the cache controller to check the object liveness cache for an entry corresponding to a cache line to be evicted prior to requesting the object liveness value.

In Example 10, the operating system in Example 9 is optionally further to update the entry in the object liveness cache with the object liveness value determined from the object liveness table.

In Example 11, in the system of Example 8, an object in the processing device cache is optionally identified by a physical address.

In Example 12, in the system of Example 11, the object liveness table optionally comprises a hierarchical structure comprising a plurality of object directories.

In Example 13, in the system of Example 12, a first segment of the physical address of the object optionally identifies a first entry in a first object directory of the plurality of object directories, the first entry comprising a value identifying a base address of a second object directory of the plurality of object directories, a second segment of the physical address of the objet optionally identifies a second entry in the second object directory, the second entry comprising a value identifying a base address of a third object directory of the plurality of object directories, and a third segment of the physical address of the object optionally identifies a third entry in the third object directory, the third entry comprising the object liveness value indicating whether the object at the physical address is dead.

Example 14 is a method comprising 1) exposing an object liveness programming interface; 2) receiving, through a call of the object liveness programming interface, object liveness data associated with an object stored in a processing device cache; 3) updating, by a processing device in a computing device, an entry corresponding to the object in an object liveness table with the received object liveness data; and 4) providing the object liveness data to a requestor in response to a request.

In Example 15, for the method of Example 14, the object liveness programming interface optionally comprises an application programming interface (API) exposed by an operating system stored in a memory in the computing device.

In Example 16, for the method of Example 14, the call of the object liveness programming interface is optionally performed by a user of the computing device through a user interface.

In Example 17, for the method of Example 14, the call of the object liveness programming interface is optionally performed by a compiler running on the computing device, wherein the compiler determines whether an object in the processing device cache is dead while compiling a computer application program to be run by the processing device.

In Example 18, for the method of Example 14, the entry in the object liveness table optionally comprises a plurality of key/value pairs, wherein the key comprises a physical address of the object in the processing device cache.

In Example 19, for the method of Example 18, updating the entry corresponding to the object in the object liveness table with the received object liveness data optionally comprises writing an indication of whether the object is dead as the value of the entry.

In Example 20, for the method of Example 19, providing the object liveness data to the requestor comprises sending the indication of whether the object is dead to the processing device cache.

Example 21 is an apparatus comprising 1) means for exposing an object liveness programming interface; 2) means for receiving, through a call of the object liveness programming interface, object liveness data associated with an object stored in a processing device cache; 3) means for updating, by a processing device in a computing device, an entry corresponding to the object in an object liveness table with the received object liveness data; and 4) means for providing the object liveness data to a requestor in response to a request.

In Example 22, for the apparatus of Example 21, the object liveness programming interface optionally comprises an application programming interface (API) exposed by an operating system stored in a memory in the computing device.

In Example 23, for the apparatus of Example 21, the call of the object liveness programming interface is optionally performed by a user of the computing device through a user interface.

In Example 24, for the apparatus of Example 21, the call of the object liveness programming interface is optionally performed by a compiler running on the computing device, wherein the compiler determines whether an object in the processing device cache is dead while compiling a computer application program to be run by the processing device.

In Example 25, for the apparatus of Example 21, the entry in the object liveness table optionally comprises a plurality of key/value pairs, wherein the key comprises a physical address of the object in the processing device cache.

In Example 26, for the apparatus of Example 25, the means for updating the entry corresponding to the object in the object liveness table with the received object liveness data optionally comprises a means for writing an indication of whether the object is dead as the value of the entry.

In Example 27, for the apparatus of Example 26, the means for providing the object liveness data to the requestor optionally comprises a means for sending the indication of whether the object is dead to the processing device cache.

Example 28 is an apparatus comprising 1) a memory; and 2) a computing system coupled to the memory, wherein the computing system configured to perform the method of any one of Examples 14 to 20.

In Example 29, for the apparatus of Example 28, the computing system optionally comprises a processing device, the processing device comprising a cache controller, a processing device cache, and an object liveness cache.

In Example 30, for the apparatus of Example 28, the memory optionally comprises an object liveness table.

Example 31 is method comprising 1) initiating a cache line eviction process; 2) determining, by a processing device, an object liveness value associated with a cache line in the processing device cache; and 3) evicting the cache line from the processing device cache based on the object liveness value and a cache line eviction policy associated with the cache line eviction process.

In Example, 32, for the method of Example 31, the method optionally includes checking an object liveness cache for an entry corresponding to the cache line.

In Example 33, for the method of Example 32, the method optionally includes if the object liveness cache does not have an entry corresponding to the cache line, determining the object liveness value from an object liveness table stored in a memory communicably coupled to the processing device.

In Example 34, for the method of Example 33, the object liveness table optionally comprises a lookup table having a plurality of key/value pairs, wherein the key comprises a physical address of an object in the processing device cache and wherein the value comprises an indication of whether the object at the physical address is dead.

In Example 35, for the method of Example 34, an object is dead if the object will no longer be accessed during the execution of an application running on the processing device.

In Example 36, for the method of Example 31, the cache line eviction policy optionally decreases a priority of the cache line when the object liveness value indicates that the cache line is dead.

In Example 37, for the method of Example 31, the cache line eviction policy optionally indicates not to write back an evicted cache line to a memory communicably coupled to the processing device.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processing device comprising:
a processing device cache;
an object liveness cache; and
a cache controller coupled to the processing device cache, the cache controller to:
initiate a cache line eviction process;
determine an object liveness value associated with a cache line in the processing device cache, wherein to determine the object liveness value, the cache controller to check the object liveness cache for an entry corresponding to the cache line, the entry in the object liveness cache comprising a copy of the object liveness value from an object liveness table stored in a memory communicably coupled to the processing device; and
evict the cache line from the processing device cache based on the object liveness value and a cache line eviction policy associated with the cache line eviction process.

2. The processing device of claim 1, wherein if the object liveness cache does not have an entry corresponding to the cache line, the cache controller to determine the object liveness value from the object liveness table.

3. The processing device of claim 2, wherein the object liveness table comprises a lookup table having a plurality of key/value pairs, wherein the key comprises a physical address of an object in the processing device cache and wherein the value comprises an indication of whether the object at the physical address is dead.

4. The processing device of claim 3, wherein an object is dead if the object will no longer be accessed during the execution of an application running on the processing device.

5. The processing device of claim 1, wherein the cache line eviction policy decreases a priority of the cache line when the object liveness value indicates that the cache line is dead.

6. The processing device of claim 1, wherein the cache line eviction policy indicates not to write back an evicted cache line to a memory communicably coupled to the processing device.

7. A system comprising:
a processing device comprising a processing device cache and an object liveness cache; and
a memory, communicably coupled to the processing device, the memory to store an operating system and an object liveness table, wherein the operating system to:
receive a request from the processing device cache for an object liveness value stored in the object liveness table, the object liveness value corresponding to a cache line to be evicted from the processing device cache;
determine the object liveness value in response to the request, wherein to determine the object liveness value, the cache controller to check the object liveness cache for an entry corresponding to the cache line, the entry in the object liveness cache comprising a copy of the object liveness value from the object liveness table stored in the memory; and
provide the object liveness value to the processing device cache.

8. The system of claim 7, wherein the processing device further comprises:
a cache controller, wherein the cache controller to check the object liveness cache for the entry corresponding to the cache line to be evicted prior to requesting the object liveness value from the object liveness table.

9. The system of claim 8, wherein the operating system further to:
update the entry in the object liveness cache with the object liveness value determined from the object liveness table.

10. The system of claim 7, wherein an object in the processing device cache is identified by a physical address.

11. The system of claim 10, wherein the object liveness table comprises a hierarchical structure comprising a plurality of object directories.

12. The system of claim 11, wherein a first segment of the physical address of the object identifies a first entry in a first object directory of the plurality of object directories, the first entry comprising a value identifying a base address of a second object directory of the plurality of object directories,
wherein a second segment of the physical address of the objet identifies a second entry in the second object directory, the second entry comprising a value identifying a base address of a third object directory of the plurality of object directories, and
wherein a third segment of the physical address of the object identifies a third entry in the third object directory, the third entry comprising the object liveness value indicating whether the object at the physical address is dead.

13. A method comprising:

exposing, by a processing device in a computing device, an object liveness programming interface;

receiving, through a call of the object liveness programming interface, object liveness data associated with an object stored in a processing device cache;

updating a first entry corresponding to the object in an object liveness table with the received object liveness data, wherein the object liveness table is stored in a memory communicably coupled to the processing device;

updating a second entry corresponding to the object in an object liveness cache, the object liveness cache comprising a copy of the object liveness data from the object liveness table; and providing the object liveness data from the object liveness cache to a requestor in response to a request.

14. The method of claim 13, wherein the object liveness programming interface comprises an application programming interface (API) exposed by an operating system stored in a memory in the computing device.

15. The method of claim 13, wherein the call of the object liveness programming interface is performed by a user of the computing device through a user interface.

16. The method of claim 13, wherein the call of the object liveness programming interface is performed by a compiler running on the computing device, wherein the compiler determines whether an object in the processing device cache is dead while compiling a computer application program to be run by the processing device.

17. The method of claim 13, wherein the entry in the object liveness table comprises a plurality of key/value pairs, wherein the key comprises a physical address of the object in the processing device cache.

18. The method of claim 17, wherein updating the entry corresponding to the object in the object liveness table with the received object liveness data comprises writing an indication of whether the object is dead as the value of the entry.

19. The method of claim 18, wherein providing the object liveness data to the requestor comprises sending the indication of whether the object is dead to the processing device cache.

* * * * *